Figure 2:
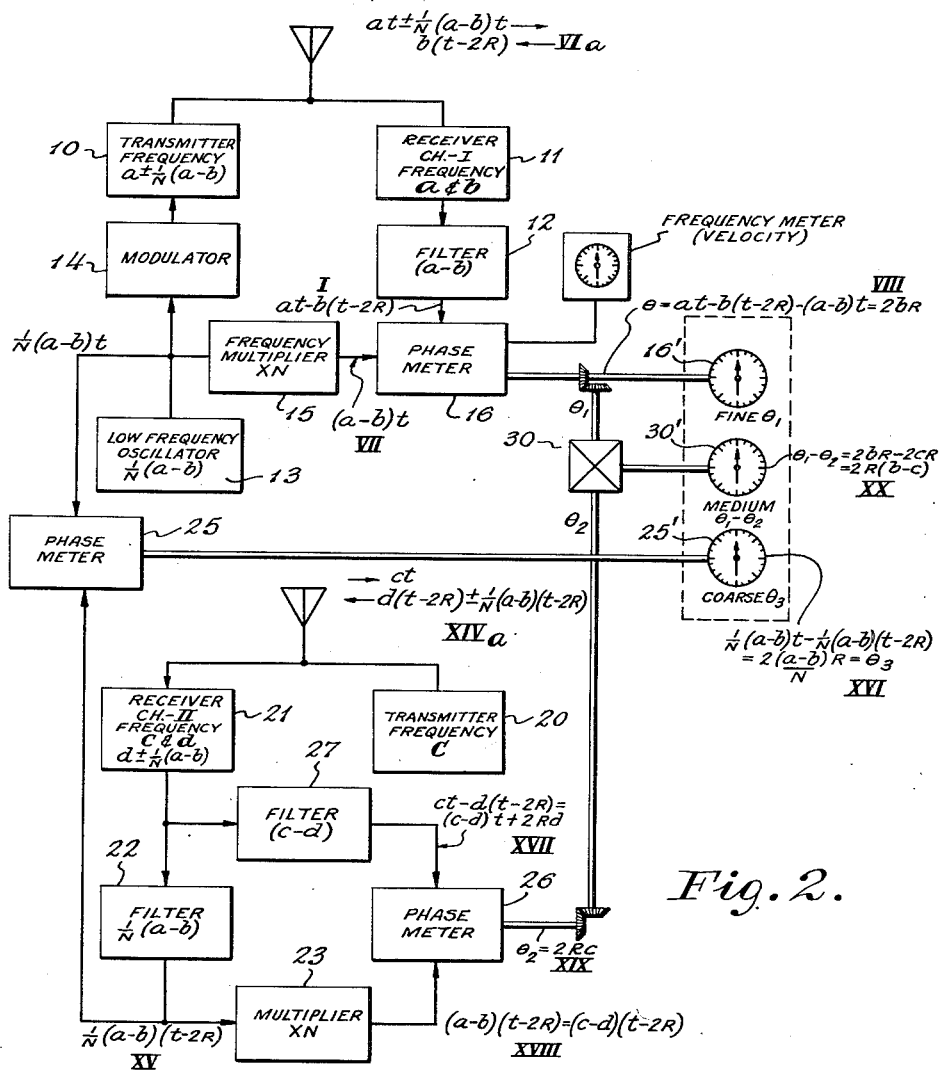

March 29, 1955  W. PALMER  2,705,320
RADIO DISTANCE MEASURING SYSTEM
Filed March 14, 1952  2 Sheets-Sheet 1

INVENTOR
WINSLOW PALMER
BY
James P. Malone
ATTORNEY

March 29, 1955

W. PALMER 2,705,320

RADIO DISTANCE MEASURING SYSTEM

Filed March 14, 1952

2 Sheets-Sheet 2

INVENTOR
WINSLOW PALMER
BY
ATTORNEY

United States Patent Office 2,705,320
Patented Mar. 29, 1955

2,705,320

RADIO DISTANCE MEASURING SYSTEM

Winslow Palmer, West Hempstead, N. Y., assignor to The Sperry Corporation, a corporation of Delaware Application March 14, 1952, Serial No. 276,534

15 Claims. (Cl. 343—9)

This invention relates to radio distance and velocity determining systems and more particularly to such systems utilizing continuous wave transmissions. This application is a continuation in part of my prior application S. N. 781,093 filed October 21, 1947, now Patent Number 2,654,884, patented October 6, 1953.

A primary object of the invention is to provide means to measure the distance between two points.

Another object of the invention is to determine the relative velocity between two points at least one of which is mobile.

Another object of the invention is to determine the distance between two points, by transmitting discrete continuous wave signals from each point and comparing them in phase, to thereby measure the distance in terms of the wavelength of one of said signals.

Another object of the invention is to provide a coarse and fine distance measuring system.

Another object of the invention is to eliminate cyclic ambiguity in continuous wave distance determining systems.

In radio range measuring systems of the continuous wave type a serious difficulty encountered is cyclic ambiguity of phase measurement. It is relatively easy to measure the difference in phase, between continuous wave signals of less than one full cycle, but it is difficult to resolve ambiguities where the phase difference measurement is more than one full cycle. For practical operation, it is quite necessary to resolve this cyclic ambiguity, for instance at 2000 kilocycles, the wavelength is approximately 150 meters, a distance which is rapidly traversed by a fast moving craft.

In this invention the distance measurement is made by a phase measurement of the carrier frequency cycles, and the cyclic ambiguity at the carrier frequency is resolved by making similar phase measurements of lower frequencies. These lower frequencies may be provided by operating two systems in parallel and utilizing the system difference frequency and also by utilizing modulation frequencies superimposed upon the carrier frequencies. If a suitable frequency ratio is chosen between the carrier, the system difference frequency, and the modulation frequency, it is possible to conveniently resolve the cyclic ambiguity at the carrier frequency. A 400:20:1 ratio has been found preferable in one embodiment of the invention.

The invention may be best understood by first stating three well-known principles.

Principle I

Given a transmitter at one location radiating a wave and a receiver responsive to the wave at another location, the phase of the wave at the receiver is delayed relative to the phase of the wave at the transmitter by an angle which is a function of the distance from the transmitter to the receiver in wavelengths.

Principle II

When two waves are mixed and the heterodyne beat is extracted, if the higher frequency component wave is shifted in phase through a certain angle, the beat frequency energy will shift in phase through the same angle and in the same direction; if the lower frequency component wave is shifted in phase through a certain angle, the beat frequency energy will shift through an equal angle but in the opposite direction.

Principle III

When a modulated wave is transmitted, the phase of the modulation frequency wave, when demodulated at the receiver, lags the modulation frequency wave at the transmitter by an angle equal to the number of wavelengths of the modulation frequency between the transmitter and the receiver.

The proofs of these principles will not be undertaken here as they are well known in the art. However, the proofs are presented in the applicant's copending application No. 782,529 filed October 28, 1947, now Patent Number 2,611,127, patented September 16, 1952.

Figure 1:
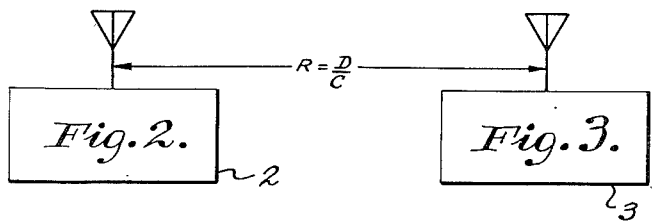
Figure 3:
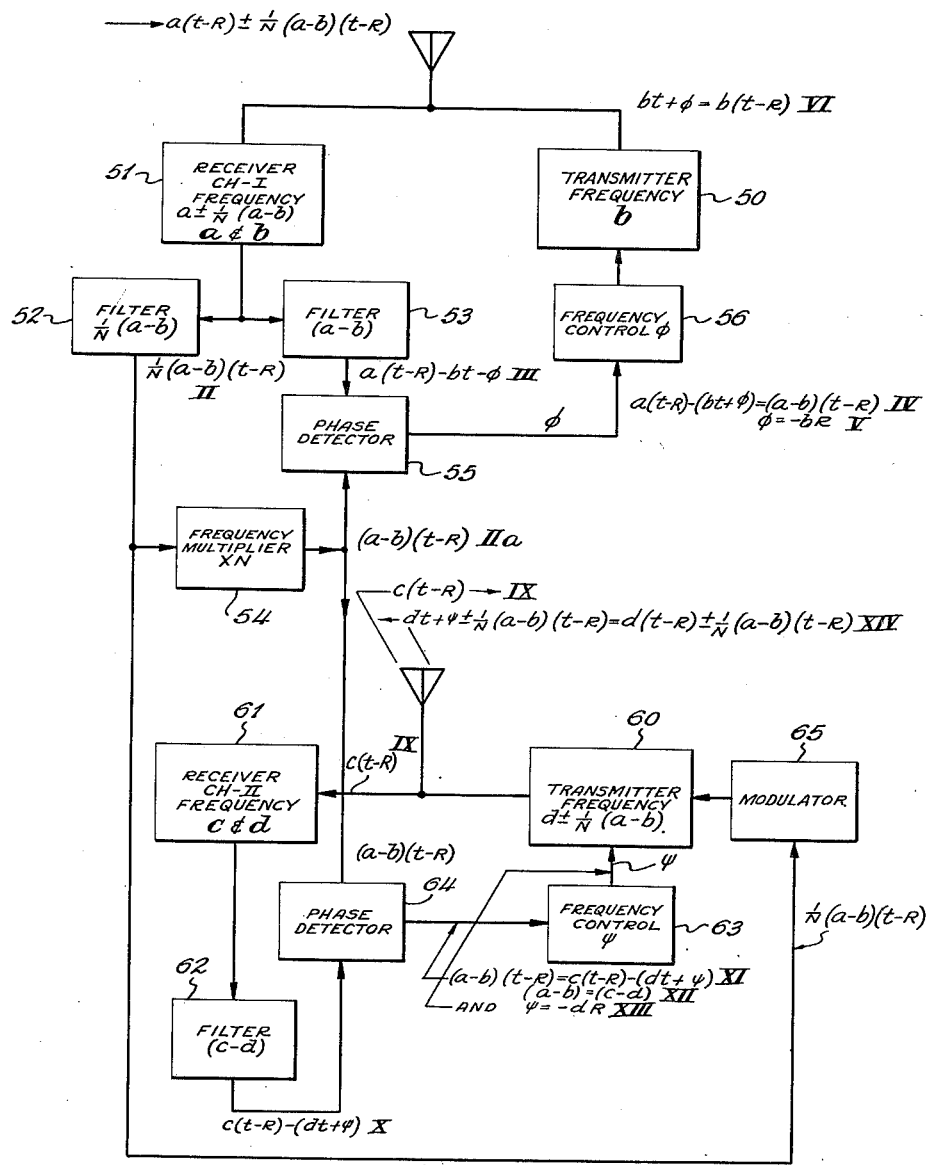

The invention will be explained by means of the following specification in connection with the drawings wherein Fig. 1 is a schematic block diagram illustrative of the invention; and Figs. 2 and 3 are schematic block diagrams of an embodiment of the invention.

Figure 1 shows the space relationship of the station apparatus of Figure 2 and Figure 3. The two stations are separated by a distance D.

$$R \text{ equals } \frac{D}{C}$$

where $C$=the velocity of propagation constant. The entire purpose of the present invention is to measure the distance D, or the equivalent time R.

The distance measuring system shown in Figures 2 and 3 will be explained together with the equations which are also shown on the drawings to facilitate the analysis of the system. Numbers over 50 relate to Fig. 3.

For the purpose of this analysis in describing waves we may omit the sine and cosine terms and the constant $2\pi$, and consider only the arguments present. For instance, instead of describing wave "a" as sine $2\pi at$, we will refer to it merely as $(at)$. After the wave $(at)$ has traveled for a time R it may be represented as $a(t-R)$.

Transmitter 10 (Fig. 2) transmits a wave $(at)$ of frequency $(a)$. Transmitter 50 (Fig. 3) transmits a wave $(bt)$ of frequency $(b)$. The receiver 11 receives the waves of both frequencies $a$ and $b$, heterodynes them, and the filter 12 then derives an alternating voltage having the beat frequency $(a-b)$ which has the argument, $$at - b(t-2R) \tag{I}$$

The $b(t-2R)$ term will be explained hereafter.

A low frequency oscillator 13 (Fig. 2) generates low frequency energy having a frequency related to the aforementioned beat frequency and equal to $$\frac{1}{N}(a-b)$$

This low frequency energy is modulated onto the wave transmitted by transmitter 10, by the modulator 14.

The receiver 51 (Fig. 3) receives the wave of frequency $a$, including the modulation energy of frequency $$\frac{1}{N}(a-b)$$

and also the wave of frequency $b$, so that the output energy from receiver 51 includes both the modulation frequency $$\frac{1}{N}(a-b)$$

and the beat frequency $(a-b)$. The modulation is extracted by the filter 52 and has the argument, $$\frac{1}{N}(a-b)(t-R) \tag{II}$$

and when multiplied by frequency multiplier 54, comprises an alternating voltage of frequency $(a-b)$ derived from the modulation, and has the argument, $$(a-b)(t-R) \tag{IIa}$$

where R is the time delay due to the transmission from the location of Figure 2 to the location represented by Figure 3.

The filter 53 derives an alternating voltage having the directly derived beat frequency which has the arguments, $$a(t-R)-bt-\phi \qquad (III)$$

where $\phi$ is a correction which will be explained.

The modulation (II) in filter 52 is applied to multiplier 54 to remove the N term to produce the alternating voltage (IIa) which is then applied to phase detector 55. The alternating voltage (III) having the directly derived beat frequency from filter 53 is also applied to phase detector 55, so that the output of the phase detector is a function of the difference in phase between the modulation wave energy from the low frequency oscillator 13 and the beat frequency output obtained from the carrier waves transmitted by transmitters 10 and 50. The correction output of the phase detector is applied to a frequency controller 56 which varies the frequency $b$ of transmitter 50 so that the alternating voltage inputs to the phase detector 55 are synchronized to have a predetermined phase relationship therebetween, thereby establishing the relation, $$a(t-R)-(bt+\theta)=(a-b)(t-R) \qquad (IV)$$

Since this must be true for all $t$, $$\phi=-bR \qquad (V)$$

Therefore, the transmitted output of transmitter 50 is equal to, $$bt+\phi=b(t-R) \qquad (VI)$$

When the wave of frequency $b$ is transmitted to the Figure 2 location it takes on the form, $$b(t-2R) \qquad (VIa)$$

Therefore, the alternating voltage beat frequency output of filter 12 (Figure 2) is of the form shown in Equation I and is applied to phase meter 16. The output of low frequency oscillator 13 is multiplied by multiplier 15 and applied to phase meter 16 as an alternating voltage of frequency $(a-b)$. It has the form, $$(a-b)t \qquad (VII)$$

Therefore, the phase difference $\theta_1$ obtained from phase meter 16' is, $$\theta_1=at-b(t-2R)-(a-b)t=2bR \qquad (VIII)$$

This is a measurement of the distance or time between the stations represented by R, in terms of the frequency $b$, and this measurement is a fine measurement of distance.

Since the wave length of the wave of frequency $b$ is relatively short there will be a considerable amount of cyclic ambiguity in the fine reading. Therefore, we have provided medium and coarse readings to resolve this cyclic ambiguity, or stated differently, to count the number of full cycles of the fine measurement, to thereby extend the usable range. These further measurements are made with different frequencies with another technique.

Transmitter 20 (Fig. 2) transmits a wave of frequency $c$ which appears in receiver 61 (Fig. 3) as, a wave of argument $$c(t-R) \qquad (IX)$$

Transmitter 60 (Fig. 3) transmits a wave of frequency $d$. The frequency $d$ is adjusted by means to be shown so that the difference $(c-d)$ is maintained equal to $(a-b)$. The receiver 61 receives and heterodynes the waves of frequency $c$ and frequency $d$ and an alternating voltage output of frequency $(c-d)$ is derived therefrom by filter 62. The frequency control 63 is adapted to apply a phase correction $\psi$ to the transmitter 60. The alternating voltage output of the filter 62 has the form, $$c(t-R)-(dt+\psi) \qquad (X)$$

This alternating voltage output (X) and the alternating voltage output (IIa) from frequency multiplier 54 are applied to the phase detector 64. The output of the phase detector 64 controls the frequency of the wave transmitted by transmitter 60 so that the two inputs to the phase detector 64 are synchronized to have a predetermined phase relationship therebetween, thereby establishing the relation, $$(a-b)(t-R)=c(t-R)-(dt+\psi) \qquad (XI)$$

Since this relation must be true for all $t$, $$(a-b)=(c-d) \qquad (XII)$$

Adding $dR$ to each side, the equation reduces to $$\psi=-dR \qquad (XIII)$$

The modulation from filter 52 represented by Equation II is also applied to the transmitter 60 by modulator 65.

Referring now to Figure 2, the receiver 21 receives the waves having the frequencies $c$ and $d$ and the modulation on the wave of frequency $d$. The transmitted wave of frequency $d$ has the following form, $$dt+\psi \pm \frac{1}{N}(a-b)(t-R)=d(t-R) \pm \frac{1}{N}(a-b)(t-R) \qquad (XIV)$$

which is received at receiver 21 as, $$d(t-2R) \pm \frac{1}{N}(a-b)(t-2R) \qquad (XIVa)$$

The modulation is derived from receiver 21 by filter 22 and is of the form, $$\frac{1}{N}(a-b)(t-2R) \qquad (XV)$$

This modulation which comprises an alternating voltage of frequency $$\frac{1}{N}(a-b)$$

and the alternating voltage output of low frequency oscillator 13 having the same frequency are applied to the phase meter 25, the output of which provides the reading $$\frac{1}{N}(a-b)t-\frac{1}{N}(a-b)(t-2R)=\frac{2(a-b)R}{N}=\theta_3 \qquad (XVI)$$

This shows the distance in terms of the modulation frequency $$\frac{1}{N}(a-b)$$

and provides a coarse measurement $\theta_3$ of the distance, on meter 25.

The output of filter 22 as shown by Equation XV, is applied through multiplier 23 to phase meter 26 as an alternating voltage of frequency $(a-b)$. The other input to phase meter 26 is the output of filter 27 which is an alternating voltage having the directly derived beat $(c-d)$ which has the following form, $$ct-d(t-2R)=(c-d)(t+2Rd) \qquad (XVII)$$

The input to phase meter 26 from multiplier 23 is $$(a-b)(t-2R)=(c-d)(t-2R) \qquad (XVIII)$$

Therefore, the output of phase meter 26 equals $$\theta_2=(c-d)t+2Rd-(c-d)t+(c-d)2R=2Rc \qquad (XIX)$$

This ouput $\theta_2$ shows a measurement of the distance in terms of the frequency $c$. This is also a fine measurement of the distance like that of phase meter 16, as shown on phase meter 16'. The output of phase meters 16 and 26 are applied to differential 30 which provides an output on meter 30', $$\theta_1-\theta_2=2bR-2cR=2R(b-c) \qquad (XX)$$

This is a measurement of the distance in terms of the system difference frequency $(b-c)$, and is shown on meter 30'.

The measuring frequencies are preferably chosen with a ratio which is ample to resolve cyclic ambiguity with conventional phase meters, as an example 20:1. In other words, the wave length of frequency $(b-c)$ may preferably be 20 times that of frequency $b$, which is a fine measuring frequency. The modulation wave length of frequency $(a-b)$ is then preferably chosen 20 times to that of the wavelength of the system difference frequency $(b-c)$. Therefore, the three meters 16', 30' and 25' provide respectively, fine, medium, and coarse measurements of the distance.

Therefore, the distance may be measured in terms of a high frequency within an accuracy of a few feet. For instance, if the wave length of the wave of frequency $b$ was equal to 1000 meters, the measurement at that frequency would have an accuracy of a few meters and a cyclic ambiguity of this fine measurement would then be resolved by the reading of meter 30' and the reading of meter 30' would again be resolved by the reading of meter 25'. Therefore the total reading would have the accuracy possible with a short wave length but would have a practical range proportional to the modulation frequency which is approximately 400 times the wave length of the fine measuring frequency. If a measuring wave length of 1000 meters was used, the double cyclic resolution of the present system would provide a usable range of about 200,000 meters or 125 miles.

All elements in the present invention, such as the transmitters, receivers, modulators, filters, phase detectors and meters, and multipliers are conventional. The stations of the present system have the advantage that they need not be triggered like transponders but may be free running.

What is claimed is:

1. A continuous wave system to measure the distance between first and second locations, comprising means at said first location to transmit a first frequency, means at said second location for transmitting a second frequency, means at said first location to transmit a modulation having a frequency related to the difference between said first and second frequencies, means at said second location to directly derive a difference beat frequency from said first and second frequencies, means at said second location to detect said modulation frequency, phase detector means connected to said last two means to compare in phase the directly derived beat frequency and said modulation frequency, means connected to said phase detector to control said second frequency transmitting means to make the phase detector inputs equal, means at said first location to directly derive said beat frequency, and phase detector means connected to said last means and said modulation and transmitting means to compare said directly derived beat frequency and said modulation frequency to thereby provide a measurement of the distance in terms of the wavelength of said second frequency.

2. A continuous system to measure the distance between first and second locations, comprising means at said first location to transmit a first frequency, means at said second location for transmitting a second frequency, means at said first location to transmit a modulation having a frequency related to the difference between said first and second frequencies, means at said second location to directly derive a difference beat frequency from said first and second frequencies, means at said second location to derive said modulation frequency, phase detector means connected to said last two means to compare in phase the directly derived difference beat frequency and said modulation frequency, means connected to said phase detector means to control said second frequency transmitting means to make said phase detector inputs equal, means at said first location to directly derive said beat frequency, first detector means connected to said last means and said modulation means to compare said directly derived beat frequency and said modulation frequency to thereby provide a measurement of the distance in terms of the wavelength of said second frequency, and means to resolve cyclic ambiguity of said measurement.

3. A continuous wave system to measure the distance between first and second locations, comprising means at said first location to transmit a first radio frequency, means at said second location for transmitting a second radio frequency, means at said first location to transmit a modulation having a frequency related to the difference between said first and second frequencies, means at said second location to directly derive a difference beat frequency from said first and second radio frequencies, means at said second location to derive said modulation frequency, phase detector means connected to said last two means to compare in phase said directly derived difference beat frequency and said modulation frequency, means connected to said phase detector means to control said second frequency transmitting means to synchronize the inputs to said phase detector means, means at said first location to directly derive said beat frequency, phase detector means connected to said last means and to said modulation transmitting means to compare said directly derived beat frequency and said modulation frequency to thereby provide a measurement of the distance in terms of the wavelength of said second frequency, and means at said first location to extend the useful range of said measurement.

4. A continuous wave system to measure the distance between first and second locations, comprising means at said first location to transmit a first frequency, means at said second location for transmitting a second frequency, means at said first location to transmit a modulation having a frequency related to the difference between said first and second frequencies, means at said second location to directly derive a difference beat frequency from said first and second frequencies, means at said second location to derive said modulation frequency, phase detector means connected to said last two means to compare in phase the directly derived difference beat frequency and said modulation frequency, means connected to said phase detector means to control said second frequency transmitting means to make the inputs to said phase detector means equal, means at said first location to directly derive said beat frequency, phase detector means connected to said last means and said modulation means to compare said directly derived beat-frequency and said modulation frequency to thereby provide a measurement of the distance in terms of the wavelength of said second frequency, means at said second location to receive and retransmit said modulation, means at said first location to receive said retransmitted modulation, and a second phase detector connected to said last means and said first location modulation transmitting means to thereby obtain an independent measurement of said distance to resolve cyclic ambiguity of said first measurement.

5. A continuous wave system to measure the distance between first and second locations, comprising means at said first location to transmit a first frequency, means at said second location for transmitting a second frequency, means at said first location to transmit a modulation having a frequency related to the difference between said first and second frequencies, means at said second location to directly derive a difference beat frequency from said first and second frequencies, means at said second location to derive said modulation frequency, first phase detector means connected to said last two means to compare in phase the directly derived difference beat frequency and said modulation frequency, means connected to said phase detector means to control said transmitting means to make the inputs to said phase detector means equal, means at said first location to directly derive said beat frequency, second phase detector means connected to said last means and said modulation means to compare said directly derived beat frequency and said modulation frequency to thereby provide a measurement of the distance in terms of the wavelength of said second frequency, means at said second location to receive and retransmit said modulation, means at said first location to receive said retransmitted modulation, a third phase detector connected to said last means and said first location modulation transmitting means to thereby obtain an independent measurement of said distance, means at said first location to transmit a third frequency, means at said second location to receive said third frequency, means at said second location to transmit a fourth frequency, means at said second location connected to derive the beat between said third and fourth frequencies, a fourth phase detector connected to said last means and said second location modulation frequency deriving means, a frequency control connected to the output of said fourth phase detector and adapted to control the frequency of said fourth frequency transmitting means so as to make the inputs at said fourth phase detector equal, means at said first location to derive the beat frequency between said third and fourth frequencies, a fifth phase detector connected to said last means and said retransmitted modulation receiving means at said first location to obtain a measurement of said distance in terms of said third frequency, and a differential connected to said third and fifth phase detectors to obtain the difference of said phase readings to thereby obtain a measurement of said distance in terms of the difference frequency between said second and third frequencies.

6. A system for measuring distance between two locations by radio means, comprising means for transmitting a continuous wave signal from a first location, means for transmitting a second continuous wave signal from a second location, means for receiving both of said signals at said first location and heterodyning said signals to obtain the difference frequency, means for transmitting a frequency related to said difference frequency to the second location as a modulation, means for receiving said continuous wave signals and said modulation at the second location, heterodyning means for said continuous wave signals to directly derive a difference frequency signal, means for comparing in phase the directly derived difference frequency signal with the modulation, means for repeating all the above steps with a second pair of continuous wave signals slightly different in frequency from said first pair of continuous wave signals but having the same difference frequency, means for synchronizing the difference frequencies in a definite phase relationship at one of said stations, and means for comparing in phase said synchronized difference frequencies at the other location to thereby provide a distance measurement as a function of said phase difference without cyclic ambiguity.

7. A continuous wave system for determining relative velocity or distance between different locations, comprising first means at a first location to transmit radio wave energy of a first frequency, second means at a second location for transmitting radio wave energy of a second frequency, means including modulation means at said first location to transmit modulation energy having a frequency related to the difference between said first and second frequencies, means at said second location for receiving and heterodyning said radio wave energy of said first and second frequencies, means coupled to said last-named means for deriving a first alternating voltage having a frequency related to the difference between said first and second frequencies, means at said second location for receiving and detecting said modulation energy, means coupled to said last-named means for deriving a second alternating voltage having a frequency substantially equal to the frequency of said first alternating voltage, first phase detector means coupled to said first and second alternating voltage deriving means to produce an output determined by the phase relationship between said first and second alternating voltages, means responsive to the output of said first phase detector means for controlling the output of said second frequency transmitting means to establish a predetermined phase relation between said first and second alternating voltages, means at said first location for receiving and heterodyning said wave energy of said first and second frequencies, means coupled to said last-named means for deriving a third alternating voltage having a frequency related to the difference between said first and second frequencies, means coupled to said modulating means at said first location to derive a fourth alternating voltage having a frequency substantially equal to the frequency of said third alternating voltage, and second phase detector means coupled to said third and fourth alternating voltage deriving means to produce an output determined by the phase relationship between said third and fourth alternating voltages.

8. A continuous wave system as defined in claim 7, and further including means coupled to said modulation energy receiving and detecting means at said second location to retransmit modulation energy having a frequency related to the frequency of said modulation energy received from said first location, means at said first location to receive and detect said retransmitted modulation energy, means coupled to said last-named means for deriving a fifth alternating voltage having a frequency related to the frequency of said modulation energy produced by said modulation means at said first location, means coupled to said last-named modulation means for deriving a sixth alternating voltage having a frequency substantially equal to the frequency of said fifth alternating voltage, and third phase detector means coupled to said fifth and sixth alternating voltage deriving means to produce an output determined by the phase relationship between said fifth and sixth alternating voltages.

9. A continuous wave system as defined in claim 8, and further including third means at said first location to transmit radio wave energy of a third frequency, fourth means at said second location to transmit radio wave energy of a fourth frequency, the difference between said third and fourth frequencies being substantially equal to the difference between said first and second frequencies, said second frequency being a multiple of the difference between said second and third frequencies, means at said second location for receiving and heterodyning said wave energy of said third and fourth frequencies, means coupled to said last-named means for deriving a seventh alternating voltage having a frequency related to the difference between said third and fourth frequencies, fourth phase detector means coupled to said last-named means and said second alternating voltage deriving means for producing an output determined by the phase relationship between said second and seventh alternating voltages, means responsive to the output of said fourth phase detector means to control the output of said fourth frequency transmitting means for establishing a predetermined phase relationship between said second and seventh alternating voltages, means at said first location for receiving and heterodyning said wave energy of said third and fourth frequencies, means coupled to said last-named means for deriving an eighth alternating voltage having a frequency related to the difference between said third and fourth frequencies, means coupled to said fifth alternating voltage deriving means at said first location to derive a ninth alternating voltage having a frequency substantially equal to the frequency of said eighth alternating voltage, fifth phase detector means coupled to said eighth and ninth alternating voltage deriving means to produce an output determined by the phase relationship between said eighth and ninth alternating voltages.

10. A continuous wave system as defined in claim 9, and further including differential means coupled to said second and fifth phase detector means to produce an output determined by the difference between the outputs of said second and fifth phase detector means.

11. A continuous wave system as defined in claim 7, wherein said means for controlling the output of said second frequency transmitting means comprises frequency control means for governing the frequency of said second frequency transmitting means in response to the output of said first phase detector means.

12. A continuous wave system as defined in claim 7, wherein the difference between said first and second frequencies is related to the frequency of said modulation energy by an integral factor.

13. A continuous wave system for determining the distance between different locations, comprising first means at a first location to transmit radio wave energy having a first frequency, second means at a second location for transmitting radio wave energy having a second frequency, means including modulation means at said first location to transmit modulation energy having a frequency related to the difference between said first and second frequencies, first receiving means at said second location for receiving said wave energy of said first and second frequencies and for receiving said modulation energy, means coupled to said first receiving means to derive a first alternating voltage from said radio wave energy of said first and second frequencies, said first alternating voltage having a frequency related to the difference between said first and second frequencies, further means coupled to said first receiving means to derive a second alternating voltage from said modulation energy, said second alternating voltage having a frequency substantially equal to the frequency of said first alternating voltage, first phase detector means coupled to said first and second alternating voltage deriving means to produce an output determined by the phase relationship between said first and second alternating voltages, means responsive to the output of said first phase detector means for controlling the output of said second frequency transmitting means to establish a predetermined phase relation between said first and second alternating voltages, second receiving means at said first location for receiving wave energy of said first and second frequencies, means coupled to said second receiving means for deriving a third alternating voltage having a frequency related to the difference between said first and second frequencies, means coupled to said modulation means at said first location to derive a fourth alternating voltage having a frequency substantially equal to the frequency of said third alternating voltage, second phase detector means coupled to said third and fourth alternating voltage deriving means to produce an output determined by the phase relationship between said third and fourth alternating voltages, means coupled to said second phase detector means to provide a measurement of the distance between said first and second locations which is a function of the wavelength of the radio wave energy of said second frequency, means coupled to said first receiving means at said second location for retransmitting modulation energy back to said first location, said retransmitted modulation energy having a frequency related to the frequency of said modulation energy from said first location, third receiving means at said first location including means to detect said retransmitted modulation energy, third transmitting means at said first location for transmitting radio wave energy having a third frequency, fourth transmitting means at said second location for transmitting radio wave energy having a fourth frequency, the difference between said third and fourth frequencies being substantially equal to the difference between said first and second frequencies, the difference between said second and third frequencies being a fraction of said second frequency, fourth receiving means at said second location for receiving radio wave energy of said third and fourth frequencies, means coupled to said fourth receiving means for deriving a fifth alternating voltage having a frequency related to the difference between said third and fourth frequencies, fourth phase detector means at said second location for receiving said second and fifth alternating voltages for producing an output determined by the phase relationship therebetween, means responsive to the output of said fourth phase detector means for controlling the output of said fourth frequency transmitting means to establish a predetermined phase relationship between said second and fifth alternating voltages, said third receiving means at said first location including means for heterodyning said radio wave energy of said third and fourth frequencies, means coupled to said heterodyning means for deriving a sixth alternating voltage from said wave energy of said third and fourth frequencies, said sixth alternating voltage having a frequency related to the difference between said third and fourth frequencies, means coupled to said retransmitted modulation detecting means at said first location for deriving a seventh alternating voltage from said retransmitted modulation energy, the frequency of said seventh alternating voltage being substantially equal to the frequency of said sixth alternating voltage, fifth phase detector means for receiving said sixth and seventh alternating voltages for producing an output dependent on the phase relationship therebetween, differential means coupled to the outputs of said second and fifth phase detector means, and means coupled to said differential means to provide a measurement of the distance between said first and second locations which is a function of the wavelength of energy having a frequency equal to the difference between said second and third frequencies.

14. In a continuous wave distance measuring system, means at one location to transmit radio wave energy of a first frequency, means at said location for receiving radio wave energy of said first frequency and for receiving radio wave energy of a second frequency, said receiving means including heterodyning means for deriving beat frequency energy from radio wave energy of said first and second frequencies, transmitting means including modulation means at said location for transmitting modulation energy having a frequency related to the difference between said first and second frequencies, first means coupled to said heterodyning means for deriving an alternating voltage having a frequency related to said beat frequency, second means coupled to said modulation means for deriving an alternating voltage having a frequency substantially equal to the frequency of said first-mentioned alternating voltage, and phase detector means coupled to said first and second deriving means for comparing the phase relationship between said alternating voltages.

15. In a continuous wave distance measuring system, means at one location for transmitting radio wave energy of one frequency, means at said location for receiving radio wave energy of said one frequency and for receiving radio wave energy of another frequency, said receiving means including heterodyning means for deriving beat frequency energy from radio wave energy of said one and said other frequencies, means at said location for receiving and detecting modulation energy having a frequency related to the difference between said one and said other frequencies, first means coupled to said heterodyning means for deriving a first alternating voltage having a frequency related to said beat frequency, second means coupled to said modulation energy receiving and detecting means for deriving a second alternating voltage having a frequency substantially equal to the frequency of said first alternating voltage, phase detector means coupled to said first and second alternating voltage deriving means for producing an output determined by the phase relationship between said alternating voltages, and means responsive to the output of said phase detector means to control the output of said transmitting means and established a predetermined phase relationship between said first and second alternating voltages.

References Cited in the file of this patent

UNITED STATES PATENTS

| | | |
|---|---|---|
| 2,248,727 | Strobel | July 8, 1941 |
| 2,529,510 | Manley | Nov. 14, 1950 |

FOREIGN PATENTS

| | | |
|---|---|---|
| 581,568 | Great Britain | Oct. 17, 1946 |